United States Patent [19]

Pasquale

[11] Patent Number: 5,586,392
[45] Date of Patent: Dec. 24, 1996

[54] SWING STROKE GARDENING TOOL

[76] Inventor: Michael J. Pasquale, 45 Spring St., Middletown, Conn. 06457

[21] Appl. No.: 444,091

[22] Filed: May 18, 1995

[51] Int. Cl.⁶ .................................................. B26B 27/00
[52] U.S. Cl. ............................... 30/318; 30/309; 30/321
[58] Field of Search ........................... 30/309, 318, 321, 30/353, 299, 303, 356, 357, 279.4, 279.2, 287, 172; 76/118; 7/159

[56] References Cited

U.S. PATENT DOCUMENTS

| | | |
|---|---|---|
| 1,068,346 | 7/1913 | Kilborn . |
| 1,520,711 | 12/1924 | Habart . |
| 1,625,081 | 4/1927 | Haas . |
| 1,850,438 | 3/1932 | Yaw ........................................ 30/279.4 |
| 2,119,449 | 5/1938 | Stump ........................................ 30/318 |
| 2,151,577 | 3/1939 | Withington ............................... 30/318 |
| 2,283,322 | 5/1942 | Edell ........................................ 30/318 |
| 2,681,506 | 6/1954 | Tipple ................................... 30/299 X |
| 3,965,991 | 6/1976 | Eads et al. .............................. 30/318 |
| 4,477,972 | 10/1984 | Testa ........................................ 30/172 |
| 5,046,254 | 9/1991 | Russell ..................................... 30/309 |

Primary Examiner—Douglas D. Watts
Attorney, Agent, or Firm—Chilton, Alix & Van Kirk

[57] ABSTRACT

A gardening tool for cutting weeds and other plant growth having a handle and a cutting head comprising first and second blade members which are adjustably positionable relative to each other. Each blade member has an elongated body having cutting edges extending along opposite longitudinal sides thereof. The blade members are connected end to end by a carriage bolt which is received by apertures in a first end of each blade member. The aperture in the first blade member is complimentary in shape to the square shank portion of the carriage bolt. The aperture in the second blade member is a star-shaped polygon which defines a plurality of contact surfaces for engagement with the square shank portion of the carriage bolt. When the second blade member is positioned on the first blade member at the desired angular orientation relative thereto, it will resist rotation due to the interengagement of the apertures with the square shank portion of the carriage bolt. The first blade member is bolted to a terminal end segment of the handle shaft. The terminal end segment is at an angle to the handle shaft such that the cutting head will extend substantially parallel to the ground when a standing operator grasps the hand grip portion of the handle.

13 Claims, 2 Drawing Sheets

SWING STROKE GARDENING TOOL

BACKGROUND OF THE INVENTION

The present invention relates generally to gardening tools for cutting weeds, grass and other plant growth. More particularly, it is concerned with gardening tools having a cutter head and a handle secured thereto, preferably with a long shaft similar to those used for golf clubs so that it can be used from a standing position.

Prior art gardening tools of this type that are known include U.S. Pat. No. 5,046,254 to Russell, U.S. Pat. No. 2,283,322 to Edell, U.S. Pat. No. 2,151,577 to Withington, and U.S. Pat. No. 1,068,346 to Kilborn. All such gardening tools include a cutting head comprising a cutting blade element. The cutting blade elements of the known gardening tools typically are of single blade construction and have a fixed configuration and length that cannot be adjusted for different plant growth conditions. Therefore, the prior art gardening tools may be inappropriate for use in certain applications. In other applications, use of such prior art gardening tools may be dangerous to the user or be highly inefficient. U.S. Pat. No. 1,625,081 to Haas provides pivotal movement of a single blade relative to the handle but no adjustment to accommodate the area of growth contacted by the blade.

SUMMARY OF THE INVENTION

Briefly stated, the invention in a preferred form is a gardening tool for cutting weeds, grass and other plant growth using a simple swinging motion while in a standing position. The gardening tool comprises a handle, preferably with a long shaft, and a cutting head having a pair of blade members adjustably positionable relative to each other. Each blade member is comprised of an elongated body having cutting edges extending along opposite longitudinal sides thereof. The blade members are mounted end to end such that one blade member may be selectively angularly oriented relative to the other blade member. The operator of the gardening tool may selectively orient the movable blade to maximize the cutting effect of the cutting head for a particular type of plant growth, maximize personal safety, or maximize the efficiency of the cutting operation for each application.

An interconnection between the blade members not only permits facile orientation of one member relative to the other but also provides firm clamping interconnection therebetween that prevents unwanted angular movement once the user secures the blades in their desired relative positions.

The cutting head is conveniently mounted on a lightweight tubular handle similar to the type used for golf clubs to facilitate the smooth gentle swinging action of the tool. The handle may be provided with an enlarged hand grip to facilitate grasping the handle adjacent its free end. Generally, the gardening tool is used to cut plant material growing from the ground at a height that is slightly above the ground. Therefore, the cutting head is fixedly mounted to the handle such that the cutting head will extend substantially parallel with the ground when a standing operator holding the hand grip swings the handle shaft.

An object of the invention is to provide a new and improved gardening tool for cutting weeds, grass and other plant growth.

Another object of the invention is to provide a new and improved gardening tool of the type described hereinabove having at least a pair of cutting blades mounted to each other to permit not only selective angularly oriented therebetween but also secure fixed positioning of the blades during use.

Yet another object of the invention is to provide a new and improved gardening tool that provides flexibility in the selection of cutting blades and in blade orientation and ready disassembly for changing or sharpening of the blades.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing in which.

DETAILED DESCRIPTION OF THE PREFERRED EMBODIMENT

Figure 3:
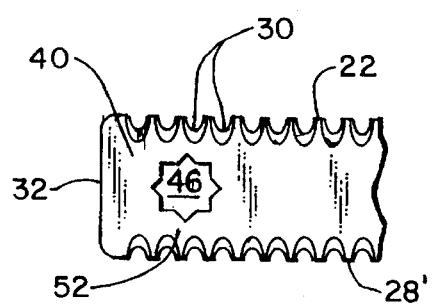
FIG. 3 is a partial top plan view of one of the blade members of FIG. 2.
Figure 2:
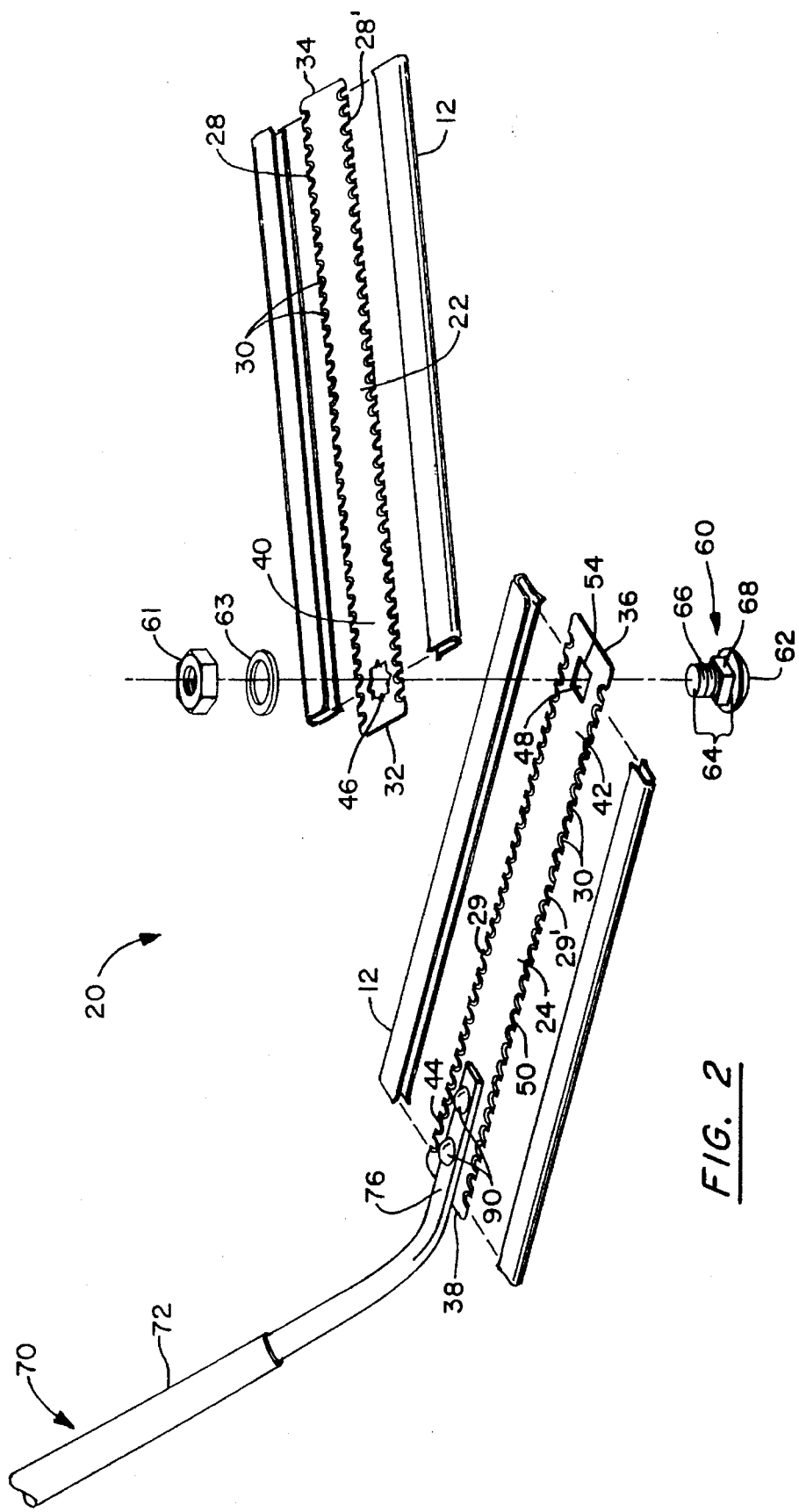
FIG. 2 is an enlarged partial exploded perspective view of the cutting head portion of the gardening tool of FIG. 1 with protective blade sleeves.

Referring now to the drawings in greater detail wherein like numerals represent like parts throughout the several figures, a gardening tool in accordance with the present invention, designated generally by the numeral 10, is shown as comprising an adjustable cutting head 20 firmly secured to a handle 70. The handle 70 comprises a lightweight tubular shaft 72, of the type used for golf clubs and the like, that tapers from its free end 71 toward its opposite end 73 secured to the cutting head 20. An enlarged hand grip 82 extends for a short distance along the shaft at the free end 71 to enclose that portion of the shaft 72 and to facilitate secure grasping of the handle during use. As best seen in FIG. 2, shaft end 73 is provided with a flattened terminal segment 76 that is bent at an angle of about 120° relative to the shaft 72 to facilitate engagement with the cutting head and positioning of the head at the requisite angle relative to the longitudinal axis of the shaft. The engagement therebetween provides a fixed and secure assembly of the cutting head on the handle. As shown in FIG. 3 this may be achieved by means of a pair of bolts 90 extending through the flattened terminal segment 76 and fixed blade member 24 of cutting head 20. As will be appreciated, rivets or other suitable fasteners that immobilize the head 20 relative to the handle 70 may be employed. The advantage of using bolts is that the head can be disassembled from the handle to facilitate sharpening or changing the blade members. As mentioned, the segment 76 is at an angle to shaft 72 such that the cutting head 20 will extend substantially parallel with the ground when a standing operator grasps the hand grip 82 and the shaft extends obliquely toward the ground.

As shown the cutting head 20 comprises a pair of blade members 22, 24 connected end to end. It will be appreciated that additional blade members may be added in similar fashion without departing from the spirit of the invention. Blade members 22, 24 are generally similar in size and shape and comprise elongated, generally rectangular body portions formed from flat sheet metal or similar material. Oppositely facing cutting edges 28, 28' and 29, 29' respectively, extending along the longitudinal side edges of the respective blade bodies. As shown in FIG. 2, each pair of opposite cutting edges 28, 28' and 29, 29' are depicted as being substantially parallel to each other. Alternatively, one or both of the blade members 22,24 may define a different shape suitable for cutting plant material, such as a crescent shape (not shown). Each cutting edge may have only a single cutting tooth or a plurality thereof with concave serrations 30, as shown, that isolate small bundles of material to be cut by each tooth of the cutting edge. Combinations of different tooth forms may be provided on each edge or on opposite edges.

Fixed blade member 24 is secured at one end to the segment 76 of handle 70 and is provided at its opposite end with an interconnection to movable blade member 22. In the embodiment illustrated, a square aperture 48 is provided at the handle-remote end of member 24 for receiving the square shank portion 68 of a carriage bolt 60. The bolt 60 preferably is inserted into the aperture 48 from the underside of blade member 24 so that the bolt head 62 rests against the flat underside of blade member 24 and the square shank portion 68 extends through and beyond the square aperture 48 to prevent rotation of the bolt 60 relative to blade 24. Of course other shank and aperture configurations may be used to prevent relative rotation therebetween other than the complementary square shape shown for the shank portion 68 and aperture 48.

The movable blade member 22 also is provided with an aperture 46 at one end for receiving the square shank portion 68 of the bolt, the length of the shank portion being sufficient to engage the aperture 46 in member 22 as well as extend entirely through aperture 48. As best shown in FIG. 3, the aperture 46 in member 22 is of a star-shaped polygon configuration that defines sixteen contact surfaces or sides 52. Thus when movable blade member 22 is positioned on member 24 at the desired angular orientation relative thereto it will resist rotation due to the interengagement of the surfaces 52 with the fixedly positioned square-shaped shank portion 68. It will of course be appreciated that the shape of the aperture in the blades may be changed so that a star shaped aperture also is provided in blade member 24 at the same or a different orientation to the longitudinal direction of the blade, thus increasing the number of angularly oriented positions of movable blade 22 relative to fixed blade 24. A nut 61 mounted on the threaded portion 66 of the bolt 60 can be tightened to clamp movable blade member 22 to fixed blade member 24 in the selected position. As shown in FIG. 2, a washer 63, such as a lock washer, also may be disposed between the nut 61 and blade member 22 to hold movable blade member 22 at its selected angular orientation relative to the fixed blade member 24.

Figure 1:
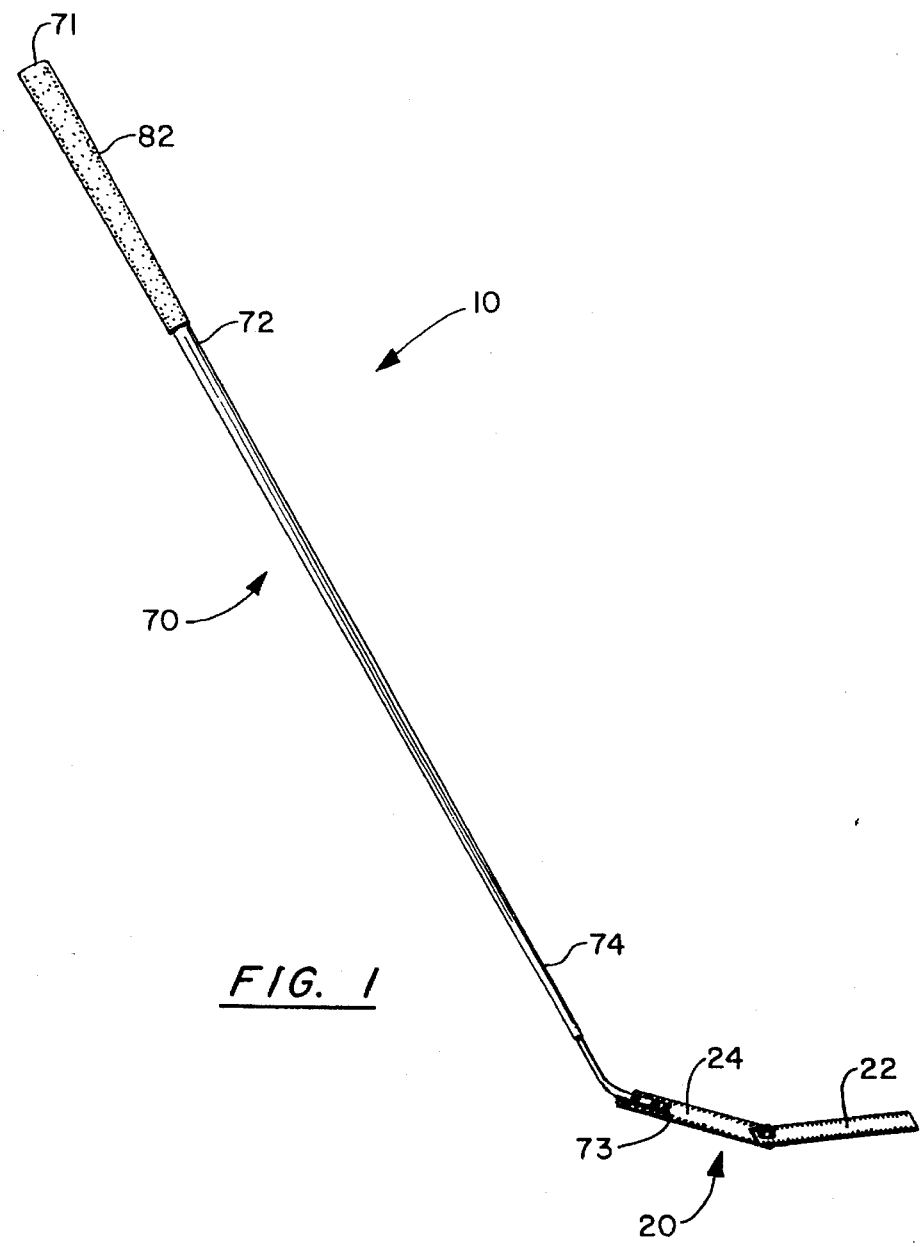
FIG. 1 is a perspective view of a gardening tool in accordance with the present invention.

The gardening tool of this invention encompasses other variations. For example the interconnection between the blades may comprise a stud portion only that is fixedly secured to one blade member by welding or other conventional means. This would reduce the possibility of misplacing the bolt during resharpening of the blades. The movable blade member 22 may be mounted above fixed blade member 24, as shown in FIG. 1, or below blade member 24. It should be appreciated that the operator may select a combination of cutting edges and/or blade member shapes that are particularly suited for a specific application by unbolting the movable blade from the fixed blade or from the handle 70 or additional blade members may be added to the cutting head assembly.

As shown in FIG. 2, sheath-like edge guards 12 may be installed on each cutting edge to protect the cutting edges from damage during storage and to protect the operator during mounting or angular rearrangement of the blade members. Each edge guard 12 is shown as comprising a C-shaped elongated plastic body that resiliently clamps to the blades over the cutting edges. Each edge guard 12 is composed of material which is softer than the blade members to prevent the edge guard 12 from dulling the cutting edges.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A gardening tool comprising a handle and a cutting head fixedly secured to the handle, said cutting head comprising a pair of elongated blade members and an adjustable interconnection therebetween for connecting the blade members end to end, said interconnection permitting selective angular positioning of said first and second blade members relative to each other and secured fastening thereof in said selected position, said interconnection comprises a bolt having a locking shank portion and a threaded portion, and a nut threadably mountable on said threaded portion, said locking shank portion being immobilized against rotation relative to one of said blade members, the other of said blade members having an aperture for receiving and cooperating with the shank portion for positioning said other blade member relative to said shank to fix the selected angular positions of said blade members.

2. The gardening tool of claim 1 wherein a said aperture includes a plurality of contact means for selectively engaging said locking shank portion.

3. The gardening tool of claim 1 wherein both of said blade members have apertures for receiving the locking shank portion and preventing rotation of the blades relative to the shank portion.

4. A gardening tool for cutting plant material with a swinging motion, said gardening tool comprising: cutting means comprising first and second blade members, said first and second blade members each comprising a first end portion wherein said first end portion of said first blade member is mounted to said first end portion of said second blade member, each of said blade members having an elongated cutting edge extending along the length thereof, the cutting edge of said first blade member effectively acting as an extension of the cutting edge of the said second blade member, said second blade member further comprising a second end portion; handle means connected to said cutting means, said handle means comprising an elongated shaft having first and second end portions, said second end portion comprising an enlarged hand grip for grasping said handle means, said second end portion of said second blade member being mounted to said first end portion of said shaft and means for mounting said first blade member to said second blade member wherein said first blade member further comprises first and second ends wherein said second end of said first blade member is selectively angularly positionable in a plurality of positions relative to said second blade member and wherein said first blade members is fixable in a selected position by said means for mounting.

5. The gardening tool of claim 4 wherein said mounting means projects outwardly from a surface of said second blade member.

6. The gardening tool of claim 5 wherein said mounting means comprises an engagement portion having a non-circular cross-section.

7. The gardening tool of claim 6 wherein said first blade member comprises first and second ends and said first end portion of said first blade member comprises aperture means for receiving said mounting means, said aperture means defining a plurality of contact means for engaging said mounting means engagement portion wherein said second end of said first blade member is selectively angularly positionable in a plurality of positions relative to said second blade member and wherein said first blade member is fixable in a selected position.

8. The gardening tool of claim 7 wherein said cross-section of said aperture means defines a polygon.

9. The gardening tool of claim 4 wherein said mounting means comprises a nut and a bolt having a first threaded portion and a second engagement portion, said engagement portion having a non-circular cross-section, said first end portion of said first blade member and said first end portion of said second blade member each comprising aperture means for receiving said bolt.

10. The gardening tool of claim 9 wherein a first of said aperture means comprises an aperture having a cross-section complementary to said bolt engagement portion cross-section wherein said first aperture means engages said bolt engagement portion preventing rotational movement therebetween and wherein a second of said aperture means comprises an aperture defining a plurality of contact means for engaging said bolt engagement portion wherein said second end of said first blade member is selectively angularly positionable in a plurality of positions relative to said second blade member and wherein said first blade member is fixable in a selected position.

11. The gardening tool of claim 4 wherein said first and second blade members each comprise first and second opposite edges, at least one of said opposite edges having a plurality of serrations longitudinally extending along said edge.

12. The gardening tool of claim 4 wherein said shaft first end portion comprises a terminal segment, said terminal segment projecting outwardly and at an inclination from said shaft, said second end of said second blade member being mounted to said terminal segment.

13. The gardening tool of claim 1 wherein said interconnection comprises a locking shank immobilized against rotation relative to one of said blade members, the other of said blade members receiving and cooperating with the shank for positioning said other blade members relative to said shank to fix the selected angular positions of said blade members.

\* \* \* \* \*